Figure 1:
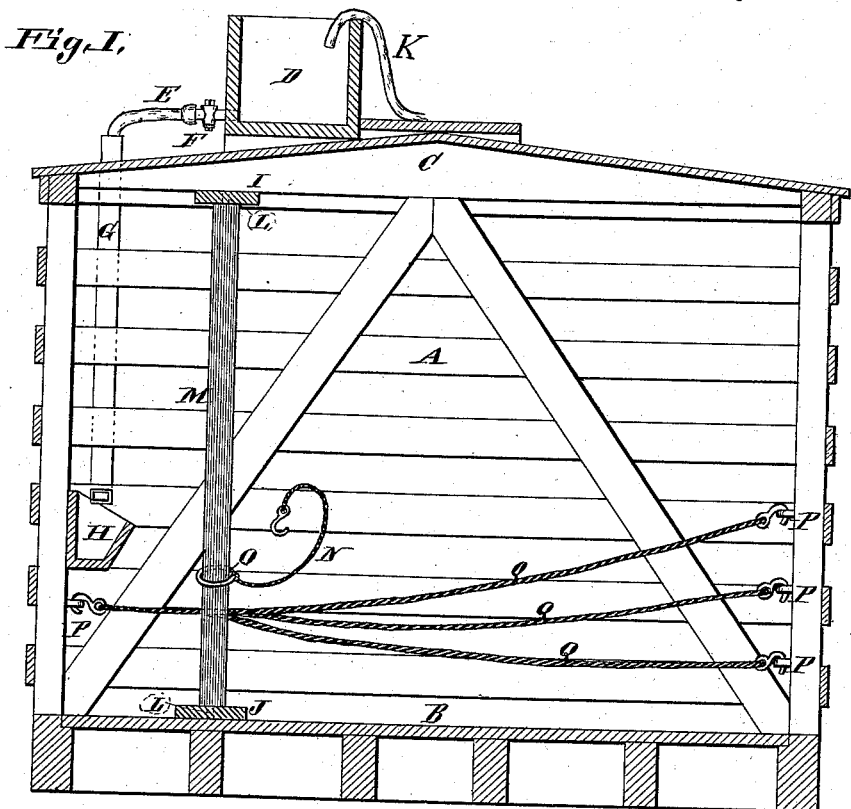

(No Model.)

J. B. CALKINS.
STOCK CAR.

No. 382,456. Patented May 8, 1888.

Attest:
E. W. Calkins.
C. Stanley Calkins.

Inventor:
James B. Calkins.

UNITED STATES PATENT OFFICE.

JAMES B. CALKINS, OF PACIFIC, MISSOURI.

STOCK-CAR.

SPECIFICATION forming part of Letters Patent No. 382,456, dated May 8, 1888.

Application filed March 19, 1888. Serial No. 267,752. (No model.)

*To all whom it may concern:*

Be it known that I, JAMES B. CALKINS, a citizen of the United States, residing at Pacific, in the county of Franklin, State of Missouri, have invented certain new and useful Improvements in Railway Stock and Freight Cars, of which the following is a full, clear, and exact description, reference being had to the accompanying drawings and letters of reference thereon, which form a part of the specification.

The object of my invention is to provide a simple, inexpensive, and convenient plan to water and feed horses and cattle while in transit in the common railway stock and freight cars now in every-day use.

The common stock-car, with its doors in the center, is objectionable on account of the inconvenience in loading. My invention does away with this objection and makes the common stock-car superior to others for loading either wild and unmanageable cattle or any kind of freight. One or more well tarred and greased ropes, which soon become polished, impervious to water, flexible, and durable, are used to prevent the animals from treading on each other when one or more are lying down. Wooden partitions are dispensed with, and there is nothing to break, bruise, or wear the hair off the animals.

In loading cattle three gates are hinged together, one end being hooked onto the side of the car at any point where the animal is required to stand, and extends thence diagonally across the car to the entrance-door. As soon as an animal enters the car, this double-hinged gate follows him to the extreme end of the car, pushing and holding him from the time he enters the car until he is forced into place. The animal can then be secured by two perpendicular posts two inches in diameter inclosing the animal's neck, and which allow him to lie down and get up. I use but one hitching-post, on which is a large sliding ring. A rope is passed around the neck and each end thereof is fastened to the ring. The partition rope or ropes are drawn back and hitched to the side of the car, preventing the animal's hind parts from moving sidewise, and the hitching-post prevents any side movement of the forward parts. The sides of the car prevent any forward or backward movement of the animal.

The proper way to feed cattle while in transit for a long distance is to give abundance of water, finely-ground grain, and a small quantity of hay cut as fine as possible, all mixed together. This manner of feeding will prevent fever in the animal, and also reduce shrinkage in weight to the least possible amount.

This invention enables me to water and feed, as above mentioned, at the same time, water and food being conveyed from the top of the car to the feed-troughs. I provide a rubber hose long enough to reach the whole length of the train, through which the water is forced by a force-pump from car to car along the running-board, and when not in use the hose is drawn back and coiled on the tank and feed car. To water and feed a few cars of stock in a mixed train, the water can be taken from the engine-tank. Food and water are mixed in a portable tub on top of the car, water flowing into the tub from a rubber hose and food and water flowing out to the troughs.

The appliances used on the inside of a car to separate the animals, so that they cannot injure each other, and at the same time allowing each one to lie down and rest or stand at will, or to water and feed, are the following: one hitching-post and short neck-rope for each animal, one or more well-tarred ropes to separate the animals, and two feed-troughs running half the length of the car. The posts and ropes can be packed in the troughs and the troughs can be lifted up and securely fastened under the roof of the car, leaving the car ready to receive the usual kind of freight. A partition for use between horses should be of netted rope thoroughly soaked in tar and grease and long enough to reach from side to side of the car.

The invention is illustrated in the accompanying drawings, in which—

Figure 2:
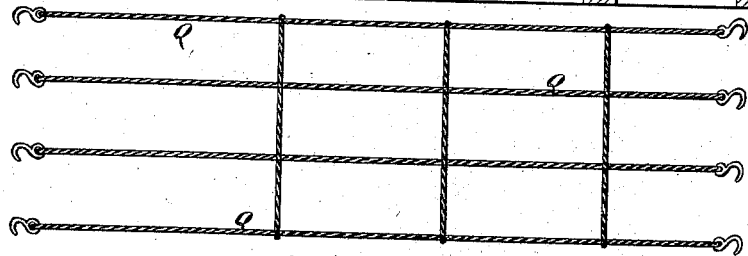
Figure 3:
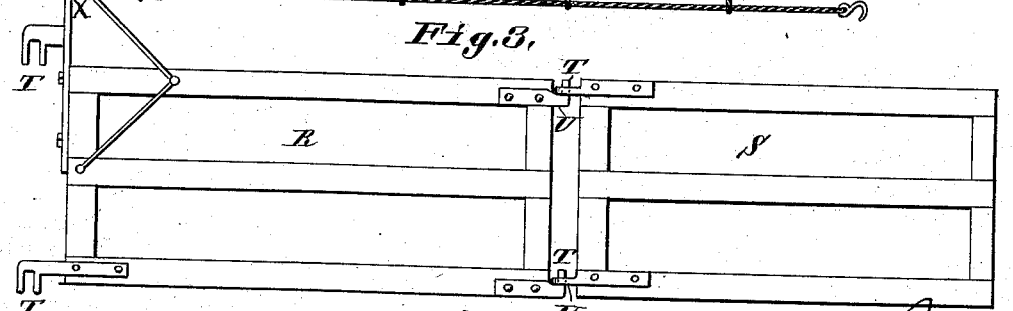
Figure 4:
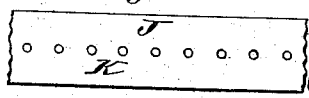

Figure 1 represents an inside end view of the common stock-car. Fig. 2 shows the rope partition; Fig. 3, the gate, and Fig. 4 the plank.

B represents the floor; C, the roof; D, feed-tub, with the long hose K extending from the feed and tank car and emptying into the tub D, in which the ground food is mixed, and from which it flows through the pipe E, down the spout G, outside of the car, into the feed-trough H.

F is a stop-cock.

M is a hitching-post, and N the hitching-rope with the sliding ring O.

J is the bottom plank, with holes K, into which the lower end of hitching-post M is secured.

Q is partition rope netting, (represented in Fig. 2,) extending from one side of the car to the other, where each end is fastened.

Fig. 3 represents the loading-gate, with loops T T to hang it on the inside slats of the car. The upper loop T slides up and down on the iron hinged rod X.

R is the gate, and S is a hinged section of it.

Having thus fully described my invention, I claim and desire to secure by Letters Patent—

The combination of the hitching-rope N, ring O, hitching-post M, plank J, pipe E, stop-cock F, tarred-rope partitions Q Q Q, loading-gate R, with hinged section S, and loops T, all substantially as set forth.

JAMES B. CALKINS.

Witnesses:
E. M. CALKINS,
C. S. CALKINS.